(12) United States Patent
Lee

(10) Patent No.: US 6,872,948 B2
(45) Date of Patent: Mar. 29, 2005

(54) PIR MOTION DETECTOR CIRCUITRY WITH ENHANCED FALSE-ACTIVATION PROTECTION

(75) Inventor: Wade Lee, Danville, CA (US)

(73) Assignee: EML Technologies LLC, Danville, CA (US)

( * ) Notice: Subject to any disclaimer, the term of this patent is extended or adjusted under 35 U.S.C. 154(b) by 147 days.

(21) Appl. No.: 10/462,095

(22) Filed: Jun. 13, 2003

(65) Prior Publication Data
US 2004/0021079 A1 Feb. 5, 2004

Related U.S. Application Data

(60) Provisional application No. 60/388,978, filed on Jun. 14, 2002.

(51) Int. Cl.[7] .................................................. G01J 5/24
(52) U.S. Cl. ................... 250/342; 250/340; 250/DIG. 1
(58) Field of Search ................................ 250/342, 340, 250/DIG. 1, 338.1, 336.1

(56) References Cited

U.S. PATENT DOCUMENTS

| | | | |
|---|---|---|---|
| 4,179,691 A | * 12/1979 | Keller | ......................... 340/567 |
| 4,364,030 A | 12/1982 | Rossin | |
| 4,384,207 A | 5/1983 | Doctor | |
| 4,875,029 A | * 10/1989 | Guscott et al. | ............. 340/567 |
| 6,060,952 A | * 5/2000 | Sawaya | ....................... 330/308 |
| 6,225,748 B1 | 5/2001 | Evans et al. | |
| 6,307,200 B1 | * 10/2001 | Kuhnly et al. | ........... 250/338.1 |
| 2003/0230721 A1 | * 12/2003 | Lee | ............................ 250/342 |

* cited by examiner

Primary Examiner—Constantine Hannaher
Assistant Examiner—Christine Sung
(74) Attorney, Agent, or Firm—Elliot B. Aronson

(57) ABSTRACT

Outdoor passive infra-red motion detector circuitry with circuit improvements that greatly reduce incidents of false activation. The motion detector includes one or more infra-red sensors and circuitry for amplifying and filtering the signal from the sensors. The amplification and filtering circuitry has a pass band for signals from the one or more sensors corresponding to a range of speeds of motion of a person moving in the field of view of the motion detector. The ability of the motion detector circuitry to filter out certain environmental sources of false activations is enhanced by providing the pass band with a very steep rolloff at the lower cutoff. In one embodiment the amplification and filtering circuitry is provided with three op amp stages, each stage being configured to contribute a nominal 6 db per octave rolloff to the lower cutoff. The amplification and filtering circuitry is also configured to provide the lower cutoff of the pass band with a fourth-order rolloff, which provides greatly enhanced protection against false activations from signals below the cutoff.

8 Claims, 1 Drawing Sheet

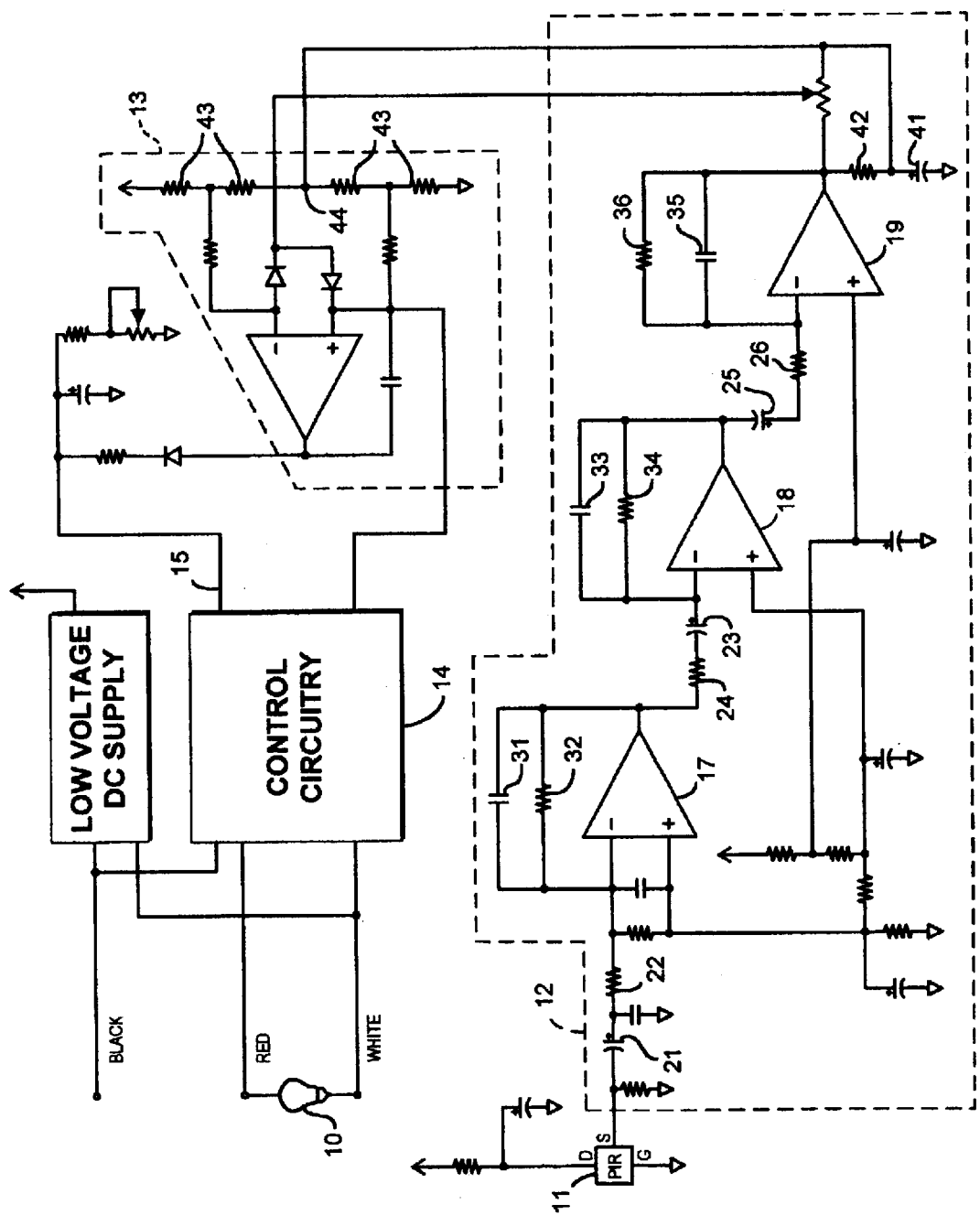

PIR MOTION DETECTOR CIRCUITRY WITH ENHANCED FALSE-ACTIVATION PROTECTION

This application claims the benefit of provisional application No. 60/388,978 filed Jun. 14, 2002.

BACKGROUND OF THE INVENTION

The present invention relates to passive infrared motion detectors of the type used in outdoor lighting fixtures to illuminate an area such as a walkway or driveway when a person or automobile approaches. The invention is more particularly directed to amplification and filtering circuitry for reducing false activations.

Outdoor motion-activated lighting fixtures are found in widespread use to monitor and illuminate areas around houses, other buildings, walkways, driveways, garden areas, gateways or other areas subject to pedestrian traffic. These lighting fixtures commonly include a passive infra-red (PIR) motion detector that operates by sensing changes in infra-red energy from the region monitored by the motion detector. The motion detector defines a plurality of sensitive detection zones interspersed with dead zones in the monitored region. Infra-red energy from the detection zones is focused onto one or more sensors while infra-red energy from the dead zones it not. As a person moves about within the region into and out of detection zones and neighboring dead zones, the amount of infra-red energy directed to one of the sensors from the detection zone will change, thereby triggering the light to go on.

PIR motion detectors are subject to false activation, that is, activation from infra-red energy changes that are caused by something other than movement of an intended target. Outdoor PIR motion detectors are susceptible in particular to false activations from environmental factors. Localized thermal imbalances and gentle air disturbances can produce localized transport of infra-red energy that is imperceptible or nearly imperceptible to casual human observation, yet that may traverse the boundary of a detection zone and trigger a false activation. Known PIR motion detectors have employed a number of methods to eliminate false activations, which nevertheless continue to occur.

SUMMARY OF THE INVENTION

The present invention provides a method and circuitry for use with outdoor PIR motion-activated lighting fixtures that greatly reduce the incidents of false activation.

The invention is utilized in an outdoor PIR motion detector typically used with lighting fixtures for monitoring a field of view although it is not essential to the invention that the motion detector activate a light, but could alternatively activate an alarm or control motor for example. Such motion detectors typically include one or more infra-red sensors and include circuitry for amplifying and filtering the signal from the sensors. The amplification and filtering circuitry has a pass band for signals from the one or more sensors corresponding to a range of speeds of motion of a person moving in the field of view of the motion detector. Briefly, in accord with one aspect of the invention the ability of the motion detector circuitry to filter out certain environmental sources of false activations is enhanced by providing the pass band with a very steep rolloff at the lower cutoff. This is achieved in one embodiment by providing the amplification and filtering circuitry with three op amp stages, each stage being configured to contribute a nominal 6 db per octave rolloff to the lower cutoff. In another aspect of the invention, the amplification and filtering circuitry is configured to provide the lower cutoff of the pass band with a fourth-order rolloff, which provides greatly enhanced protection against false activations from signals below the cutoff.

Other aspects, advantages, and novel features of the invention are described below or will be readily apparent to those skilled in the art from the following specifications and drawings of illustrative embodiments.

BRIEF DESCRIPTION OF THE DRAWING

The FIGURE shows an electronic schematic diagram of a passive infra-red motion detector circuit incorporating an embodiment of the invention.

DETAILED DESCRIPTION OF ILLUSTRATIVE EMBODIMENTS

The FIGURE shows an embodiment of a circuit schematic for controlling the power to a light 10 in a PIR motion detector incorporating an embodiment of the invention. By way of overview, the circuit of the FIGURE includes an infrared pyroelectric sensor 11, which responds to infra-red energy incident upon it from the region monitored by the motion detector and provides a sensor output signal representing the changes in incident infrared energy. Although shown here with a single sensor, the circuitry may be used with a plurality of sensors, which for example may be ANDed together, and no limitation to a single sensor is intended. The incident infrared radiation may originate from a person or other target of interest moving in the monitored region or it may stem from other, extraneous sources. The sensor output signal is applied to an amplification and filtering section indicated generally at block 12. The amplified and filtered signal from block 12 is applied to a thresholding element, provided here by a window comparator 13, which detects whether the signal indicates the presence or absence of motion, that is to say, discriminates whether the infra-red radiation incident upon sensor 11 most likely emanated from a desired target moving within the monitored field. A desired target such as a moving person within the range of the motion detector will typically cause a noticeably larger change in incident infrared radiation than other sources. The window comparator determines whether the signal is of sufficient magnitude to, warrant energizing the light. When the signal from the amplification and filtering section 12 exceeds the threshold magnitude, the signal is assumed to stem from a desired target in the region monitored by the device.

When such a sufficiently large signal is detected, indicating a desired target is present in the monitored region, the thresholding element provides a triggering signal at its output, which is applied to control circuitry 14 along line 15. The control circuitry causes light 10 to be energized in response to the trigger signal. Such control circuitry is well known in the art and plays no role in the invention. It is mentioned here only by way of general background. Signals at window comparator 13 less than the threshold value are assumed to stem from something other than a desired target and no triggering signal is provided. The use of window comparators and other thresholding comparator arrangements in PIR motion detectors for this purpose is common, and their structure and operation are well known to those of ordinary skill in the art and need not be described in any further detail here.

As mentioned above, variations in infra-red energy incident upon sensor 11 sometimes emanate from undesired sources and can cause false activations of the light. One of the known ways of discriminating against such undesired targets is for the amplification and filtering block 12 to define a bandpass filter having a pass band corresponding to a range of speeds of a desired target, typically a person, as the person moves across the monitored field. As the person crosses detection zones and dead spaces in the field, the resulting signal from sensor 11 will be characterized by a frequency corresponding to the intruder's speed. The pass band is set to pass frequencies corresponding to a range of speeds of human movement across the field. The pass band has a lower cutoff corresponding to a slowest speed of movement of a person in the field of view that will trigger the motion detector for turning on the light, that is, the slowest speed for which the motion detector is set to detect motion. Typically the pass band will have a lower cutoff of about 0.3 to 0.6 Hz although it may sometimes be as high as about 0.8 Hz and an upper cutoff of about 4.0 to 8.0 Hz.

Known PIR motion-detector circuitry in common use, and in particular circuitry in common use with outdoor motion-activated lighting, typically includes at most two stages of amplification. In the past it has generally been preferred to have two amplifier stages because the two stages were perceived to give adequate motion-detecting performance without the added cost and complexity of a third or more stages. It is well known that added op amp stages amplify noise sources and irregularities along with the desired signal and can lead to unstable performance. It has been discovered in the present invention, however, that adding a third stage can appreciably reduce false activations. In particular, by adding a third amplification stage at least a third-order bandpass filter is achieved, and in the embodiment illustrated in the FIGURE a fourth-order bandpass filter is achieved, providing significantly steeper falloff at the boundaries of the pass band. The steeper bandpass helps eliminate those false activations due to signals just outside the desired frequency range, thus eliminating false activations from movements that are too slow or too fast to reasonably correspond to a person moving in the field of view. This is achieved while not affecting the detectability of incidents falling within the passband.

In the embodiment of the FIGURE the amplification and filtering block 12 is configured as a bandpass filter having three op amp gain stages and having a pass band with a lower cutoff having a fourth-order rolloff so as to provide substantial steepness particularly at the low end for reducing false activations from such common environmental factors as localized temperature fluctuations and slowly moving thermal disturbances. The three stages of amplification are provided by op amps 17, 18 and 19. Each op amp has a high-pass filter at its input comprised principally of capacitor 21 and resistor 22 for op amp 17, capacitor 23 and resistor 24 for op amp 18, and capacitor 25 and resistor 26 for op amp 19. As is well known, each op amp stage (including the high-pass filter) contributes a nominal 6 db per octave voltage rolloff. The low-frequency corners of the three component high-pass filters are preferably set at the same nominal frequency although some variation may occur while still retaining the steep rolloff for the low-frequency side of the overall passband lower cutoff frequency. The cutoff frequency will typically fall within the 0.3 to 0.5 Hz range, although the precise setting is at the discretion of the circuit designer. Each op amp is provided with a high-frequency feedback network comprising, respectively, capacitor-resistor pairs 31, 32; 33, 34; and 35, 36, which define the rolloff characteristics and frequency of the upper cutoff. Each op amp stage contributes a pole to the lower cutoff. A fourth pole is contributed by the RC filter network between the final amplification stage and window comparator 13 comprising capacitor 41, resistor 42, and the resistors 43 used in setting the window comparator reference levels. Note that the threshold-setting resistors in the window comparator play a role in establishing the rolloff characteristics of the RC filter network, and so these resistors may also be considered to contribute to the amplification and filtering circuitry even though they are not illustrated as falling within the block 12. The window comparator has a center node 44 that establishes the center of the window between the upper and lower threshold level. The RC network is connected to the center node through resistor 42 for adjusting the window center and thereby the upper and lower window thresholds with respect to the output of op amp 19.

The RC filter network passes higher-frequency signals above the cutoff value to ground through capacitor 41. Lower-frequency signals below the cutoff value are passed on to the window comparator where they effectively adjust the threshold voltages of the window comparator. Thus, when op amp 19 provides a very low frequency signal corresponding to a slow moving environmental disturbance, the RC filter network allows the window comparator center and consequently the threshold reference voltages to follow the low frequency output of op amp 19. The result is that the window comparator is prevented from passing such low-frequency signals.

While the invention is illustrated in the FIGURE with a window comparator, the use of a window comparator is not necessary to enjoy the benefits of the invention. The principles illustrated here may be applied to other thresholding circuits to adjust threshold reference levels and add a further pole contributing to a steeper rolloff at the low-frequency cutoff.

The above descriptions and drawing are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention and fall within the scope of the invention, which is to be defined by the following claims.

What is claimed is:

1. PIR motion detector circuitry for use in monitoring a field of view, said circuitry having one or more infra-red sensors and having amplification and filtering circuitry coupled to said one or more sensors, said amplification and filtering circuitry having a pass band for signals from said one or more sensors corresponding to a range of speeds of motion of a person in said field of view, wherein the improvement is characterized in that:

said pass band has a lower cutoff with a fourth-order rolloff providing substantial steepness for reducing false activations of said motion detector from signals below said lower cutoff.

2. PIR motion detector circuitry having one or more infra-red sensors and having amplification and filtering circuitry coupled to said one or more sensors, said amplification and filtering circuitry having a pass band for signals from said one or more sensors corresponding to a range of speeds of motion of a person across said one or more sensors, wherein the improvement is characterized in that:

said amplification and filtering circuitry has three op amp stages, each stage contributing a nominal 6 db per octave rolloff to the lower cutoff of said pass band.

3. The apparatus of claim 2 wherein each said op amp stage includes an input high-pass RC filter providing said rolloff.

4. The apparatus of claim 2 wherein said motion detector circuitry further comprises comparator circuitry defining a threshold, said comparator circuitry passing signals from said amplification and filtering circuitry exceeding said threshold, and the improvement is further characterized in that:

the output of the final stage of said amplification and filtering circuitry is coupled to said comparator circuitry through an RC filter network operative to pass signals above a low-frequency cutoff to ground and to pass signals below said low-frequency cutoff to said comparator circuitry for adjusting said threshold.

5. The apparatus of claim 4 wherein said comparator circuitry defines a window comparator having a center node establishing a center window value and wherein said RC filter network comprises at least one capacitor to ground and at least one resistive element connecting said final stage output to said center node for adjusting the window thresholds.

6. The apparatus of claim 4 wherein each said op amp stage includes an input high-pass RC filter providing said rolloff.

7. A method of reducing false activations in an outdoor PIR motion detector for monitoring a field of view, said motion detector having one or more infra-red sensors and having amplification and filtering circuitry coupled to said one or more sensors, said amplification and filtering circuitry having a pass band for signals from said one or more sensors corresponding to a range of speeds of motion of a person in said field of view, said pass band having a lower cutoff corresponding to a slowest speed of said person for triggering the motion detector, said method comprising:

providing said lower cutoff with a fourth-order rolloff.

8. A method of reducing false activations in an outdoor PIR motion detector for monitoring a field of view, said motion detector having one or more infra-red sensors and having amplification and filtering circuitry coupled to said one or more sensors, said amplification and filtering circuitry having a pass band for signals from said one or more sensors corresponding to a range of speeds of motion of a person in said field of view, said pass band having a lower cutoff corresponding to a slowest speed of said person for triggering the motion detector, said method comprising:

providing said amplification and filtering circuitry with three op amp stages, each stage being configured to contribute a nominal 6 db per octave rolloff to said lower cutoff.

* * * * *